United States Patent
Yaguchi et al.

(10) Patent No.: US 7,224,887 B1
(45) Date of Patent: May 29, 2007

(54) RECORDING AND REPRODUCING APPARATUS, MPEG IMAGE STREAM RECORDING AND REPRODUCING

(75) Inventors: Yoshitaka Yaguchi, Takatsuki (JP); Toshikazu Kodo, Nishinomiya (JP); Yoshiki Kuno, Moriguchi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 690 days.

(21) Appl. No.: 09/762,380

(22) PCT Filed: Jun. 5, 2000

(86) PCT No.: PCT/JP00/03620

§ 371 (c)(1),
(2), (4) Date: Feb. 7, 2001

(87) PCT Pub. No.: WO00/76212

PCT Pub. Date: Dec. 14, 2000

(30) Foreign Application Priority Data

Jun. 7, 1999 (JP) ................................. 11-160076

(51) Int. Cl.
*H04N 5/91* (2006.01)
(52) U.S. Cl. ........................ 386/95; 386/46; 386/124
(58) Field of Classification Search ............... 386/46, 386/65, 66, 95, 98, 124, 125
See application file for complete search history.

(56) References Cited

U.S. PATENT DOCUMENTS

| | | | |
|---|---|---|---|
| 5,568,274 A | | 10/1996 | Fujinami et al. |
| 5,602,956 A | | 2/1997 | Suzuki et al. |
| 5,801,781 A | * | 9/1998 | Hiroshima et al. ......... 348/441 |
| 5,828,416 A | * | 10/1998 | Ryan ........................... 386/95 |
| 5,835,668 A | * | 11/1998 | Yanagihara ................. 386/95 |
| 5,838,873 A | * | 11/1998 | Blatter et al. .............. 386/95 |
| 6,292,621 B1 | | 9/2001 | Tanaka et al. |
| 6,366,731 B1 | * | 4/2002 | Na et al. ...................... 386/46 |

(Continued)

FOREIGN PATENT DOCUMENTS

EP 0 712 256 A 5/1996

(Continued)

OTHER PUBLICATIONS

Japanese Official Action for Japanese Patent Application No. 2000-169700, dated Apr. 26, 2005.

(Continued)

*Primary Examiner*—James J. Groody
*Assistant Examiner*—James A. Fletcher
(74) *Attorney, Agent, or Firm*—RatnerPrestia

(57) ABSTRACT

There is a PSI receipt waiting time of two seconds or so from a start of decoding of an MPEG transport stream to actual display of AV data. There are provided first means of recording 3 for recording a predetermined signal discretely including additional information of a program; means of controlling records 2 for having said predetermined signal recorded by first means of recording 3; means of controlling reproduction 4 for having said predetermined signal reproduced from said first means of recording 3; means of detecting PSI 1 for detecting program specific information (PSI) from said predetermined signal; and means of adding PSI 5 for adding said PSI to said predetermined signal.

12 Claims, 13 Drawing Sheets

30: MPEG transport stream recording and reproducing apparatus

U.S. PATENT DOCUMENTS 6,456,782 B1 * 9/2002 Kubota et al. ............... 386/98
2003/0033613 A1 * 2/2003 Yoo et al. .................... 386/46

FOREIGN PATENT DOCUMENTS

| JP | 6-261303 | 9/1994 |
| JP | 6-268969 | 9/1994 |
| JP | 7-162800 | 6/1995 |
| JP | 08-235832 | 9/1996 |
| JP | 09-214889 | 8/1997 |
| JP | 9-259574 | 10/1997 |
| WO | WO 98/30023 A | 7/1998 |

OTHER PUBLICATIONS

Japanese search report for PCT/JP00/00956 dated Oct. 3, 2000.
English translation of Form PCT/ISA/210.
European Search Report for Application No. EP 00 93 1687, dated Sep. 9, 2005.
Supplemental European Search Report for Application No. EP 00 93 1687, dated Nov. 1, 2005.

* cited by examiner

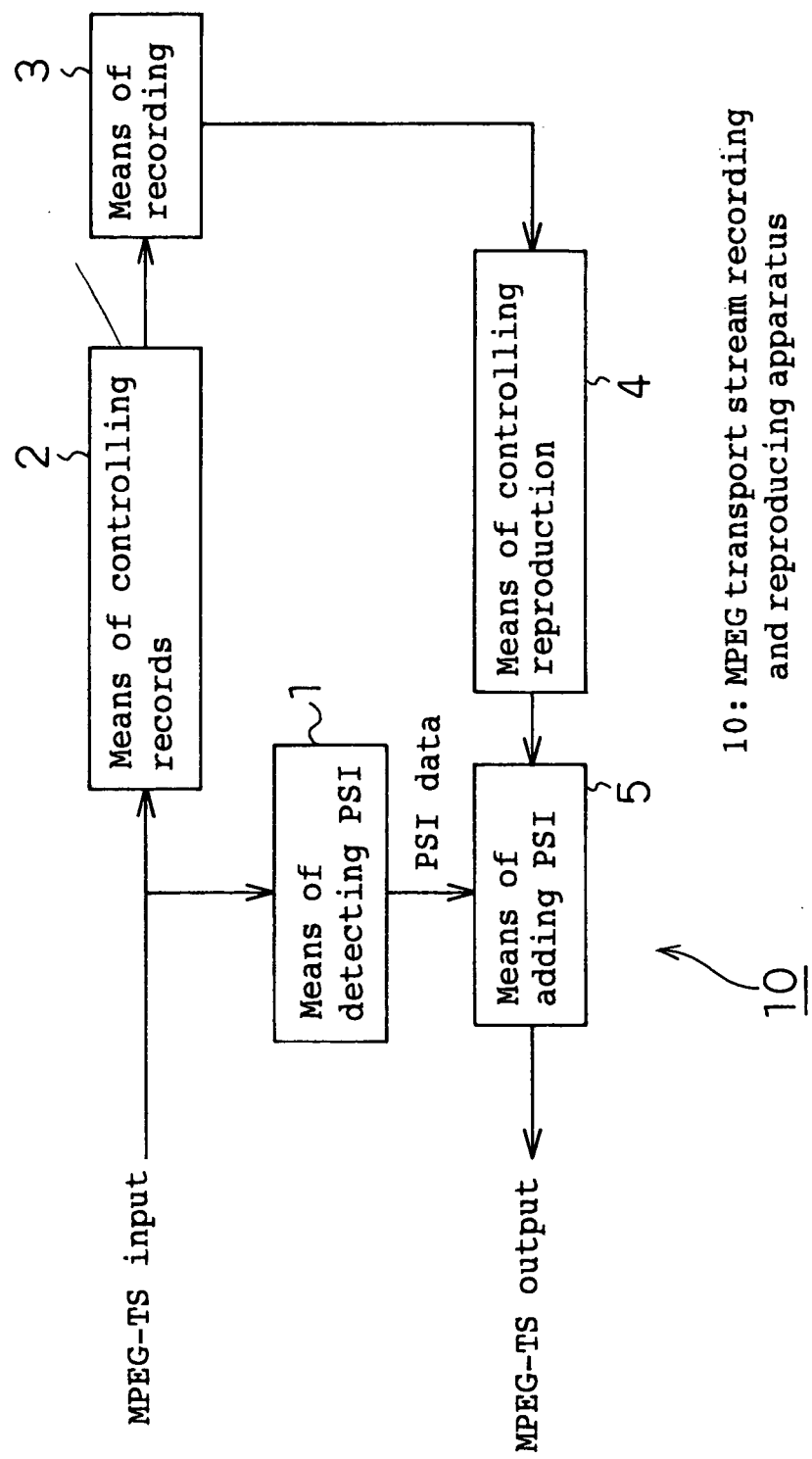

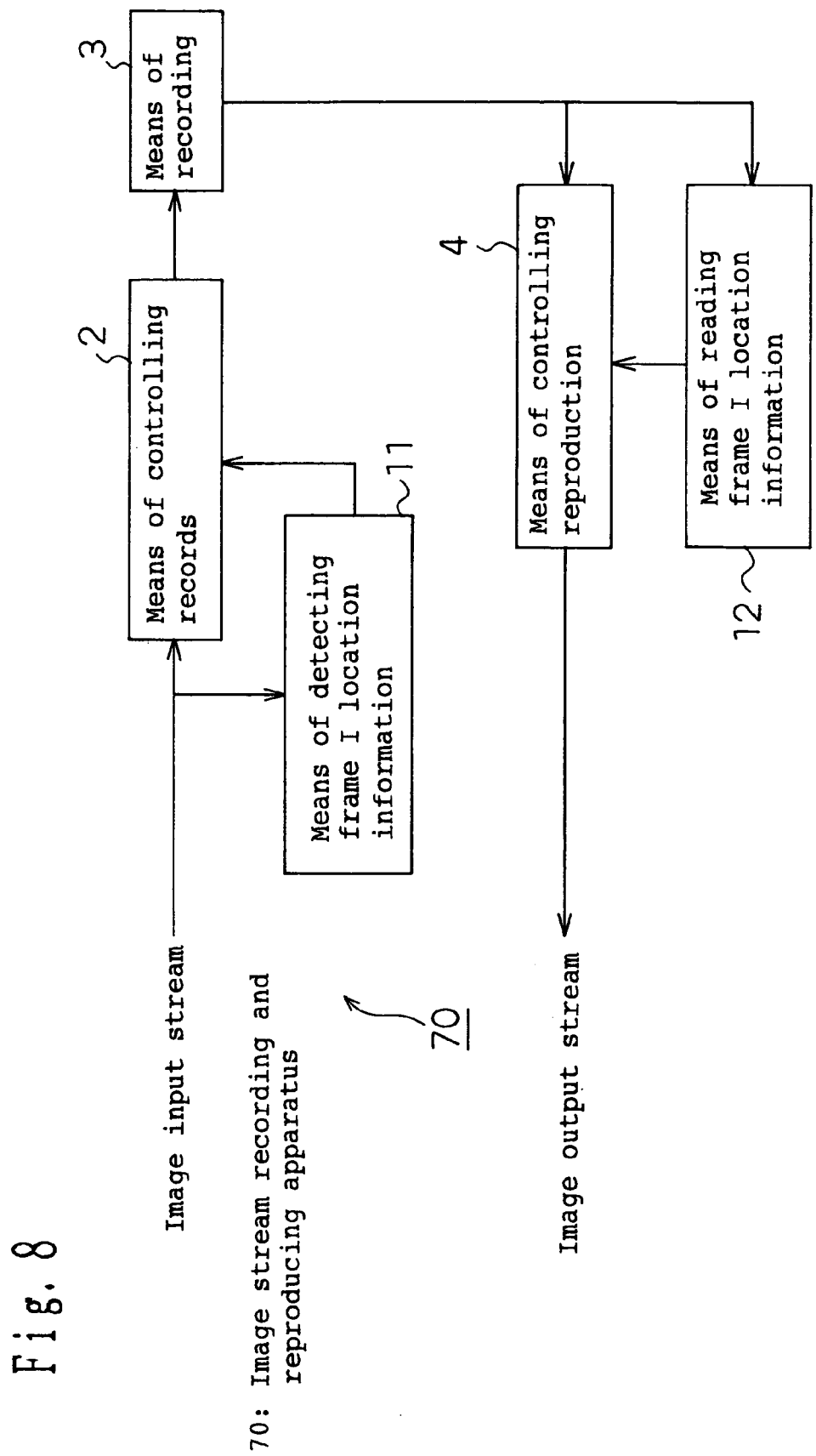

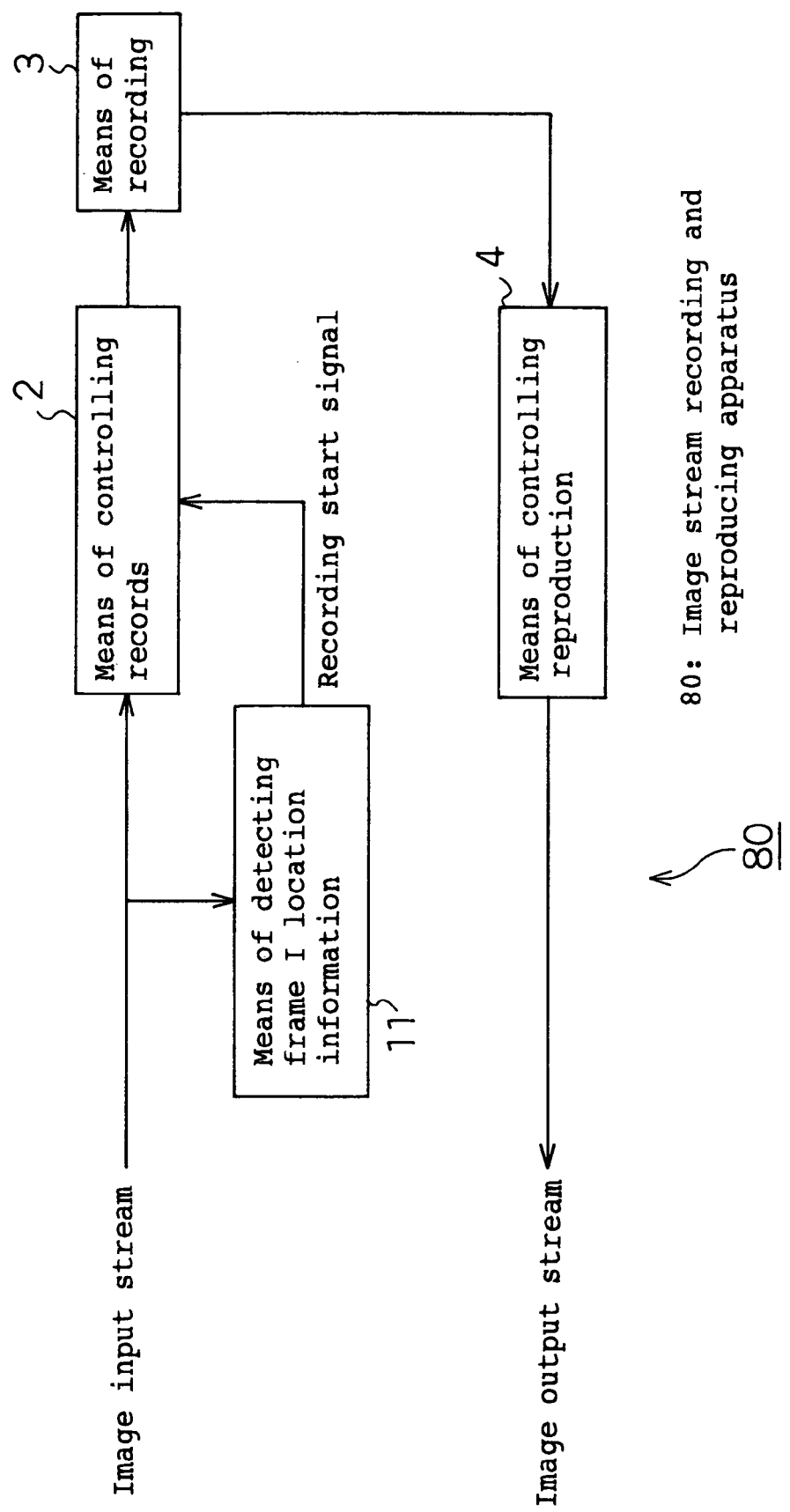

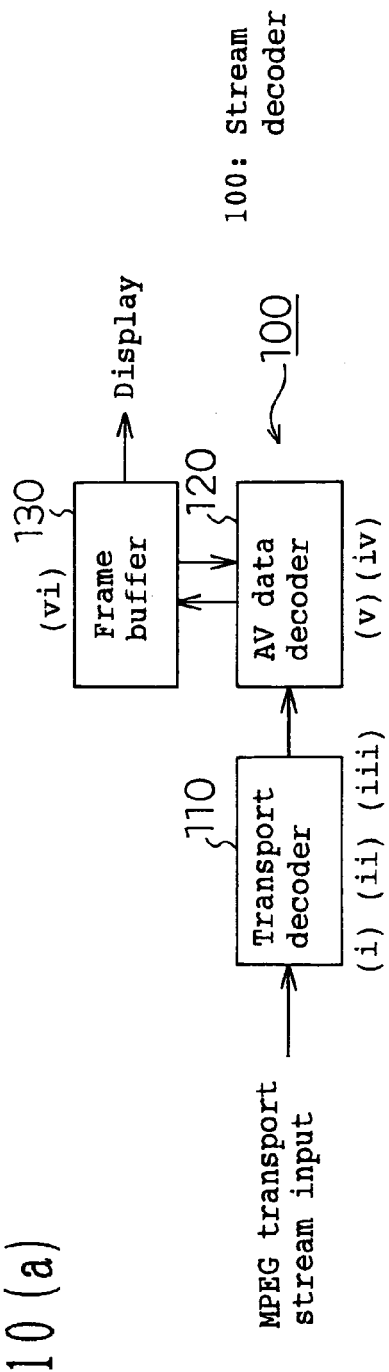
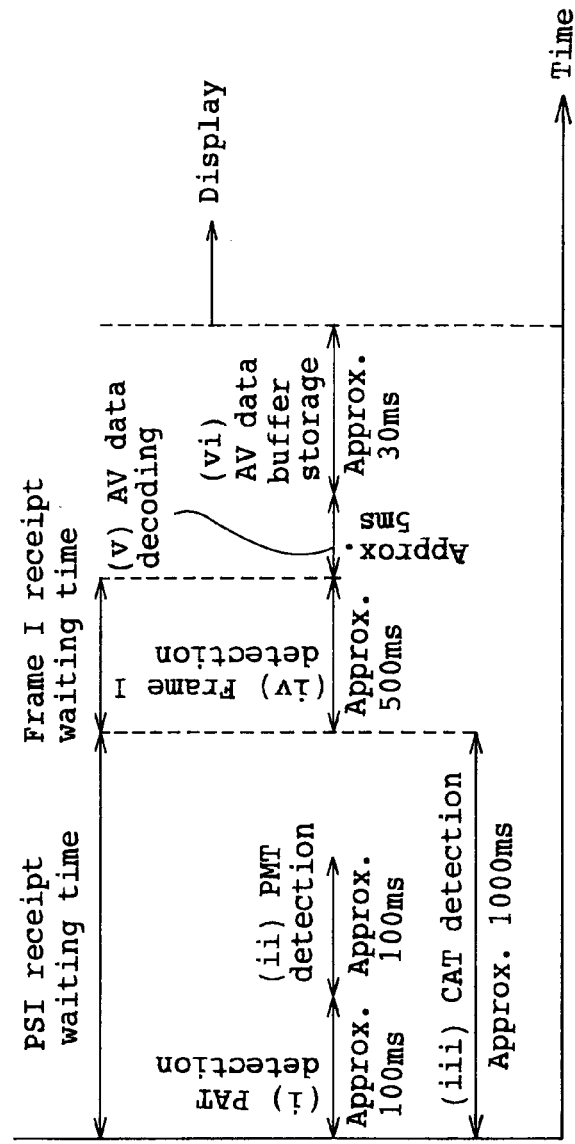
Fig. 10(a)
Fig. 10(b)

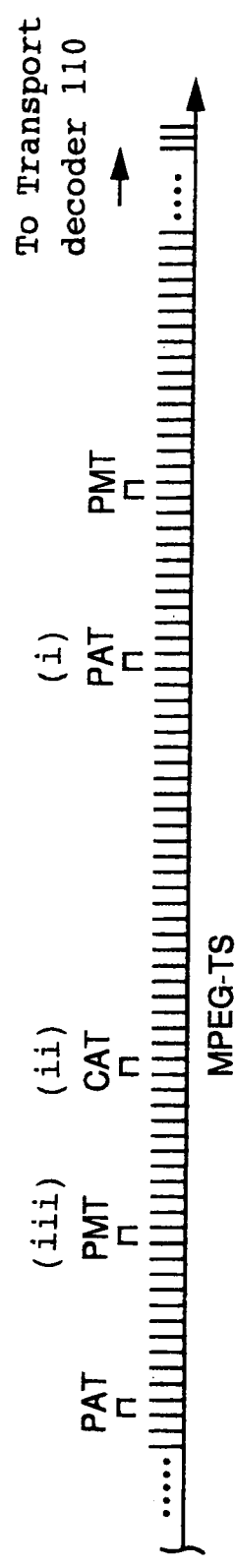
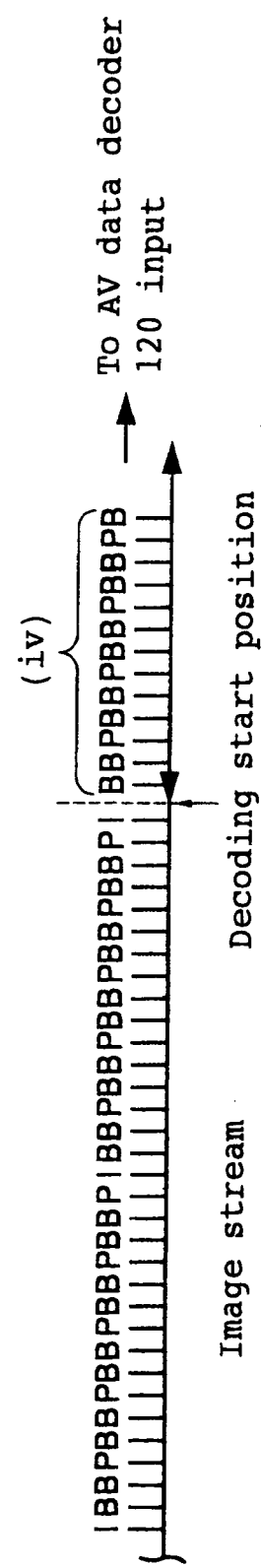
Fig. 11(a)
Fig. 11(b)

RECORDING AND REPRODUCING APPARATUS, MPEG IMAGE STREAM RECORDING AND REPRODUCING

TECHNICAL FIELD

The present invention relates to a recording and reproducing apparatus, an MPEG image stream recording and reproducing apparatus and so on.

BACKGROUND ART

Conventionally, a signal compression technology in compliance with the MPEG (Moving Picture Experts Group) standard has been used in various fields and is applied to AV data recording and reproducing apparatus for instance.

FIG. 10 (a) is a diagram showing an example of general configuration of a decoder of audio/visual data (hereafter referred to as AV data) compressed in a form of an MPEG transport stream (hereafter referred to as MPEG-TS).

As shown in the diagram, in a stream decoder 100, a transport decoder 110 is means of receiving input of an MPEG-TS. Also, an AV data decoder 120 is means of receiving output from a transport decoder 110, and a frame buffer 130 is means of accessing an AV data decoder 120 and reproducing the AV data in a form capable of displaying on a display unit.

Next, FIG. 10 (b) is a diagram showing a procedure for decoding and reproducing an MPEG-TS with time as its horizontal axis, and FIG. 11 (a) is a diagram showing a configuration of an MPEG-TS, and FIG. 11 (b) is a diagram showing a configuration of an image stream in an AV bit stream. Hereafter, MPEG-TS decoding and reproducing operation by a stream decoder 100 will be described referring to the drawings.

First, if an MPEG-TS is inputted to the transport decoder 110, the transport decoder 110 detects any PAT from the inputted MPEG-TS as a step shown in (i) of FIG. 10 (b). Here, a PAT (Program Association Table) is a packet comprising, in an MPEG-TS, a program number assigned to a program recorded in the MPEG-TS and a PMT (Program Mat Table) showing an ID of a packet for transmitting a stream such as AV data composing the program, and PATs are scattered in an MPEG-TS as shown in FIG. 11 (a). Moreover, PMTs also exist as packets in an MPEG-TS.

The transport decoder 110 detects any PAT and then detects any PMT as a step shown in (ii) of FIG. 10 (b), and as the case may be, further detects any ID called CAT (Conditional Access Table) concurrently with detection of any PAT and PMT as a step shown in (iii) of FIG. 10 (b). While AV data used for pay broadcasting is scrambled so that a general viewer without a special purpose decoder cannot view it, a CAT shows an ID of a packet for transmitting decoding information for descrambling it, existing as a packet in an MPEG-TS.

The program specification information such as PAT, PMT and CAT is collectively called PSI (Program Specific Information), and so it can be said that operation of transport decoder 110 as shown in (i), (ii) and (iii) of FIG. 10 (b) is performing detection of PSI.

An MPEG-TS in which PSI is detected by the transport decoder 110 is inputted as an AV bit stream to the AV data decoder 120. The AV data decoder 120 decodes an image stream from the inputted MPEG-TS. As shown in FIG. 11 (b), in an MPEG bit stream, an image stream comprises the image frames of frame I, frame B and frame P, and of these image frames, the frame that must be decoded first is frame I. Thus, as in the steps shown in (iv) of FIG. 10 (b) and FIG. 11 (b), the AV data decoder 120 first detects a frame I. If the frame I is detected, with the frame I as a starting point, an image stream is decoded from the MPEG-TS (step (v) of the same Figure). The decoded AV data is outputted to a frame buffer.

The frame buffer receives input of AV data from an AV data decoder, and accumulates a certain amount of it (step (vi) of FIG. 10 (b)) and then outputs it to a display apparatus such as a display unit.

Incidentally, according to the above operation, it requires two seconds or so from a start of decoding an MPEG transport stream to actual display of AV data. This is caused by operation for decoding an MPEG-TS into ordinary AV data, and the time can be divided into two as follows. One is the time required for detecting PSI in a transport decoder (PSI waiting time), and the other is the time required for detecting the frame I in an AV decoder (frame I waiting time).

The time required for detecting PSI and the time required for detecting the frame I are felt by a user of an MPEG transport stream reproducing apparatus as waiting time from performing reproducing operation to actually becoming capable of viewing AV data, which has been problematic in terms of convenience.

DISCLOSURE OF THE INVENTION

The present invention was achieved in view of such a problem, and an object is to provide an MPEG transport stream recording and reproducing apparatus and an MPEG image stream recording and reproducing apparatus of which convenience has been improved by shortening the waiting time from actually performing operation for starting reproduction to becoming capable of viewing AV data.

One aspect of the present invention is a recording and reproducing apparatus, characterized by comprising:

first means of recording for recording a predetermined signal discretely including additional information of a program;

means of controlling records for having said predetermined signal recorded by said first means of recording;

means of controlling reproduction for having said predetermined signal reproduced from said first means of recording;

means of detecting additional information for detecting said additional information of a program from said predetermined signal; and means of adding additional information for adding said additional information to said predetermined signal.

Another aspect of the present invention is a recording and reproducing apparatus, characterized by comprising:

first means of recording for recording a predetermined signal discretely including additional information of a program;

means of controlling records for having said predetermined signal recorded by said first means of recording;

means of controlling reproduction for having said predetermined signal reproduced from said first means of recording;

means of detecting PSI or SI for detecting PSI (Program Specific Information) or SI (Service Information) from said predetermined signal; and means of adding PSI or SI for adding said PSI or SI to said predetermined signal.

Still another aspect of the present invention is an MPEG image stream recording and reproducing apparatus, comprising:

sixth means of recording for recording an MPEG image stream;

means of controlling records for having said MPEG image stream recorded by said sixth means of recording;

means of controlling reproduction for having said MPEG image stream reproduced from said sixth means of recording;

means of detecting frame I location information for detecting a location of frame I in said MPEG image stream as frame I location information; and means of managing frame I location information for managing said frame I location information, characterized in that:

said means of controlling reproduction acquires frame I location information from said means of managing frame I location information and, based on it, reproduces an MPEG image stream having frame I at its head.

Yet another aspect of the present invention is a recording and reproducing apparatus, comprising:

first means of recording for recording an MPEG transport stream;

means of controlling records for having said MPEG transport stream recorded by said first means of recording;

means of controlling reproduction for having said MPEG transport stream reproduced from said first means of recording;

means of detecting PCR (Program Clock Reference) from said MPEG transport stream; and means of adding PCR for adding said PCR to said MPEG transport stream.

BRIEF DESCRIPTION OF THE DRAWINGS

FIG. 1 is a diagram showing a configuration of an MPEG transport stream recording and reproducing apparatus according to Embodiment 1 of the present invention;

FIG. 2 (b) is a diagram showing a configuration of an image stream processed by an MPEG image stream recording and reproducing apparatus of the present invention;

FIG. 8 is a diagram showing a configuration of an MPEG image stream recording and reproducing apparatus according to Embodiment 7 of the present invention;

FIG. 9 is a diagram showing a configuration of an MPEG image stream recording and reproducing apparatus according to Embodiment 8 of the present invention;

FIG. 10 (a) is a diagram showing a configuration of a stream decoder by a conventional technology;

FIG. 10 (b) is a flowchart showing how an MPEG-TS is decoded by an AV data decoder;

FIG. 11 (a) is a diagram showing a configuration of an MPEG-TS processed on a stream decoder;

FIG. 11 (b) is a diagram showing a configuration of an image stream processed on a stream decoder;

DESCRIPTION OF SYMBOLS

Figure 2A:
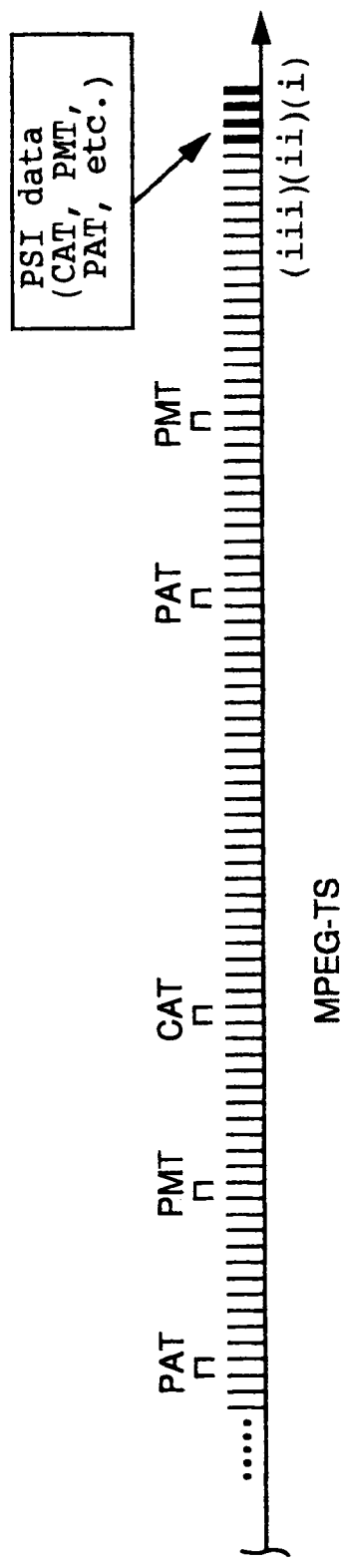
FIG. 2 (a) is a diagram showing a configuration of an MPEG-TS processed by an MPEG transport stream recording and reproducing apparatus of the present invention.

1 Means of detecting PSI or SI
2 Means of controlling records
3 Means of recording
4 Means of controlling reproduction
5 Means of adding PSI or SI
6 Means of managing PSI or SI location information
10, 20, 30, 40, 50 MPEG transport stream recording and reproducing apparatus
11 Means of detecting frame I location information
12 Means of managing frame I location information
13 Means of reading frame I location information
60, 70, 80 Image stream recording and reproducing apparatuses
100 Stream decoder
110 Transport decoder
120 AV data decoder
130 Frame buffer

BEST MODE FOR CARRYING OUT THE INVENTION

Hereafter, Embodiments of the present invention will be described.

Embodiment 1

FIG. 1 is a diagram showing a configuration of an MPEG transport stream recording and reproducing apparatus according to Embodiment 1 of the present invention. As shown in the diagram, in the MPEG transport stream recording and reproducing apparatus 10, means of detecting PSI 1 and means of controlling records 2 are means of directly receiving input of an MPEG transport stream (MPEG-TS). Also, means of recording 3 is means of recording an MPEG-TS under control of means of controlling records 2, and has a random access function such as an HDD. Means of controlling reproduction 4 is means of reproducing an MPEG-TS recorded in means of recording 3. In addition, means of adding PSI 5 is means of receiving input from means of detecting PSI 1 and means of controlling reproduction 4 and outputting an MPEG-TS to the outside of MPEG transport stream recording and reproducing apparatus 10.

This Embodiment 1 of the present invention having the above configuration will be described next.

First, recording operation will be described. If means of controlling records 2 starts operation for recording an MPEG-TS, an MPEG-TS is inputted from the outside, and then the MPEG-TS is inputted to both means of detecting PSI 1 and means of controlling records 2. On receipt of input of the MPEG-TS, means of controlling records 2 records it in means of recording 3. The MPEG-TS is saved as accumulated data in means of recording 3.

On the other hand, on receipt of input of the MPEG-TS, means of detecting PSI 1 detects any PAT, PMT and CAT that are the packets comprising PSI from each of the packets comprising the MPEG-TS, and records them as PSI data. Here, the PSI data is the packets comprising the PSI data arranged as one in predetermined order such as a PAT first, a PMT next and a CAT at last. Moreover, at the time of detecting the PSI data, means of detecting PSI 1 also concurrently detects values of cyclic counters held by the PAT, PMT and CAT respectively. Here, the cyclic counters are data to which values of 0 to 15 are given in various packets comprising an MPEG-TS including a PAT, a PMT and a CAT, and the MPEG-TS is reproduced by consecutively detecting these values.

Thus, in recording operation, an MPEG-TS is recorded in means of recording 3 and PSI data is recorded in means of detecting PSI 1 respectively.

Next, a reproducing operation will be described. Means of controlling reproduction 4 reads an MPEG-TS recorded in means of recording 3 and outputs it to means of adding PSI 5. Also, means of detecting PSI 1 outputs PSI data to means of adding PSI 5.

On receipt of input of the MPEG-TS from means of controlling reproduction 4 and the PSI data from means of detecting PSI 1 respectively, means of adding PSI 5 adds the PSI data to the head of the MPEG-TS. At this time, means of adding PSI 5 performs addition by processing the values of cyclic counters of the PAT, PMT and CAT comprising the PSI data so that they keep continuity with the values of cyclic counters of the PAT, PMT and CAT comprising the PSI detected earlier.

The MPEG-TS of which head PSI data is added to as above is outputted to the outside of MPEG transport stream recording and reproducing apparatus 10.

Figure 2B:
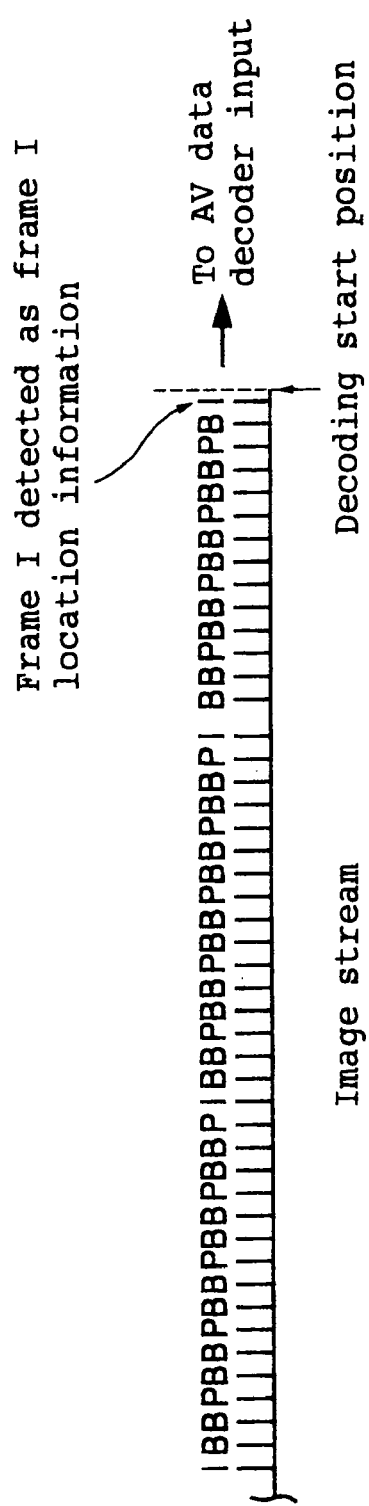

A reproduced MPEG-TS is decoded by a conventional MPEG-TS decoder, and at that time, as shown in FIG. 2 (*a*), a PAT, a PMT and a CAT that are PSI are given in the form of PSI data to the head of the MPEG-TS, and so the decoder processes such data first. Therefore, the decoder does not need to perform operation for detecting any PMT, PAT and so on so that the time therefore is saved.

Thus, at the time of recording an MPEG-TS, an MPEG transport stream recording and reproducing apparatus of this Embodiment 1 detects PSI included in an MPEG-TS to be recorded as PSI data in advance and at the time of reproduction, adds it to the head of the MPEG-TS to be reproduced so as to allow time for preparation required for reproduction to be shortened as a whole by omitting operation for detection of PSI by the decoder on decoding.

Moreover, while the above description was given on the assumption that the packets of the PAT, PMT and CAT comprising PSI are single packet respectively, there are also cases where a PAT, a PMT and a CAT are comprised of a plurality of packets respectively. In this case, on detecting PSI, means of detecting PSI 1 detects values of cyclic counters of the PAT, PMT and CAT concurrently with order of arrangement of the plurality of packets, and means of adding PSI 5 performs addition to the MPEG-TS so that the order of arrangement of the packets keeps continuity as with the values of cyclic counters.

Moreover, as for a method of keeping continuity of values of cyclic counters, it is also possible to rewrite the values of cyclic counters of the PSI data to be added in accordance with the values of cyclic counters of the PSI originally included in the MPEG-TS, or to replace respective PSI originally included in the MPEG-TS in accordance with the values of cyclic counters of the PSI data to be added. Especially, this rewriting is implemented by replacing every PSI included in the original MPEG-TS with said PSI data of which values of cyclic counters are consecutively changed.

Embodiment 2

Figure 3:
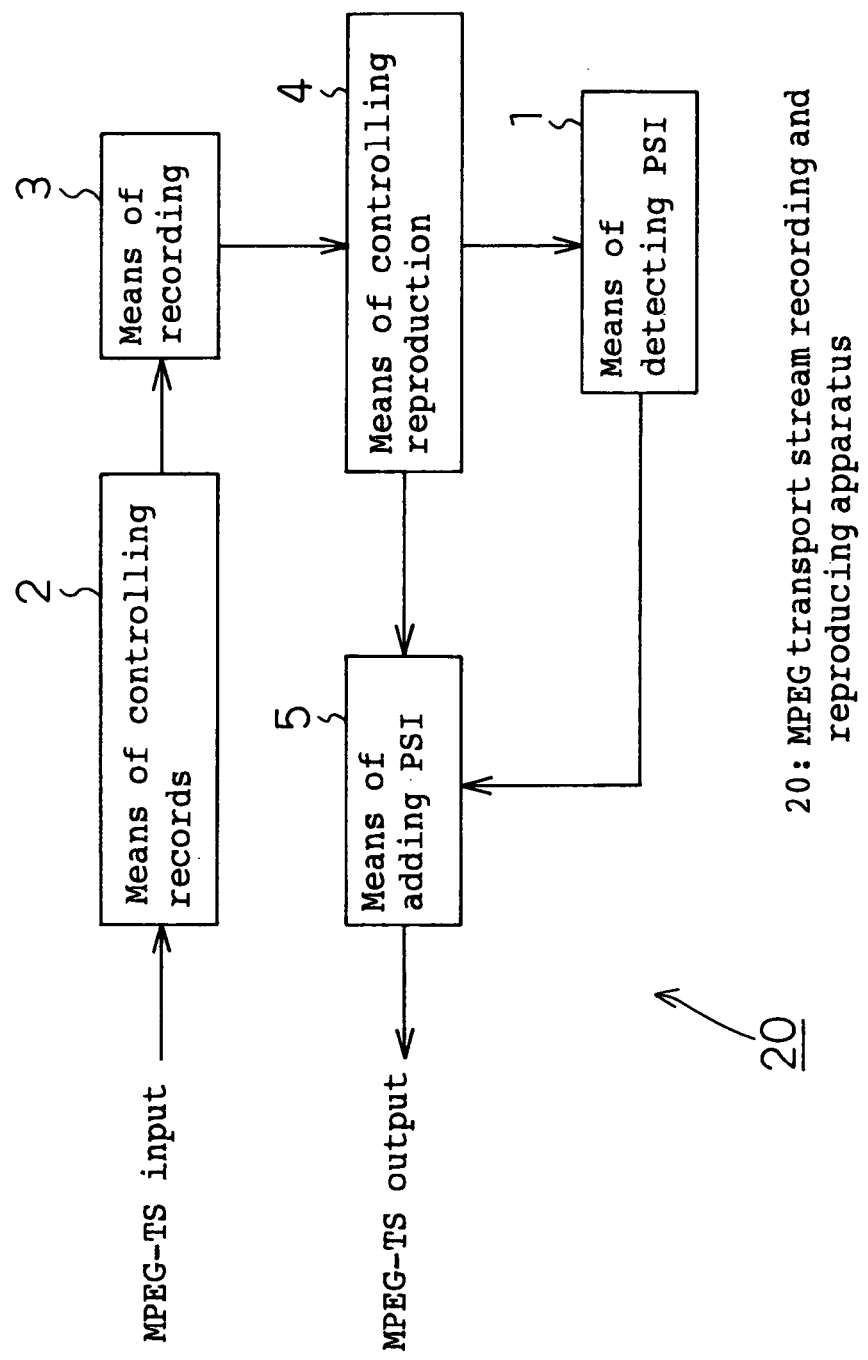
FIG. 3 is a diagram showing a configuration of an MPEG transport stream recording and reproducing apparatus according to Embodiment 2 of the present invention.

FIG. 3 is a diagram showing a configuration of an MPEG transport stream recording and reproducing apparatus according to Embodiment 2. As shown in the diagram, in the MPEG transport stream recording and reproducing apparatus 20 wherein the same numbers as FIG. 1 indicate the same divisions, means of detecting PSI 1 is provided on a reproduction side, and means of controlling reproduction 4 outputs to both means of adding PSI 5 and means of detecting PSI 1, and means of adding PSI 5 receives input from means of controlling reproduction 4 and means of detecting PSI 1.

This Embodiment 2 having the above configuration will be described next.

First, recording operation will be described. If means of controlling records 2 starts operation for recording an MPEG-TS, an MPEG-TS is inputted from the outside, and then the MPEG-TS is inputted to means of controlling records 2. On receipt of input of the MPEG-TS, means of controlling records 2 records it in means of recording 3. Similarly as Embodiment 1, the MPEG-TS is saved as accumulated data in means of recording 3.

Next, reproducing operation will be described. Means of controlling reproduction 4 reads an MPEG-TS recorded in means of recording 3 and outputs it to means of adding PSI 5 and means of detecting PSI 1.

On receipt of input of the MPEG-TS, just as in Embodiment 1 to be implemented hereafter, means of detecting PSI 1 detects PSI as PSI data together with its values of cyclic counters and outputs them to means of adding PSI 5.

On receipt of input of the MPEG-TS from means of controlling reproduction 4 and the PSI data from means of detecting PSI 1 respectively, means of adding PSI 5 adds the PSI data to the head of the MPEG-TS so that continuity of the values of cyclic counters is kept and outputs them to the outside of MPEG transport stream recording and reproducing apparatus 10.

Thus, an MPEG transport stream recording and reproducing apparatus of this Embodiment 2 detects PSI included in an MPEG-TS as PSI data when reproducing the MPEG-TS and adds it to the head of the MPEG-TS so as to allow time for preparation required for reproduction of the MPEG-TS to be shortened as a whole by eliminating the need to record PSI data from means of detecting PSI.

Moreover, as in this embodiment 1, while the above description was given on the assumption that the packets of the PAT, PMT and CAT comprising PSI are single packet respectively, there are also cases where a PAT, a PMT and a CAT are comprised of a plurality of packets respectively. In this case, on detecting PSI, means of detecting PSI 1 detects values of cyclic counters of the PAT, PMT and CAT concurrently with order of arrangement of the plurality of packets, and means of adding PSI 5 performs addition to the MPEG-TS so that the order of arrangement of the packets keeps continuity as with the values of cyclic counters.

Moreover, as for a method of keeping continuity of values of cyclic counters, it is also possible to rewrite the values of cyclic counters of the PSI data to be added in accordance with the values of cyclic counters of the respective PSI originally included in the MPEG-TS, or to replace respective PSI originally included in the MPEG-TS in accordance with the values of cyclic counters of the PSI data to be added.

Embodiment 3

Figure 4:
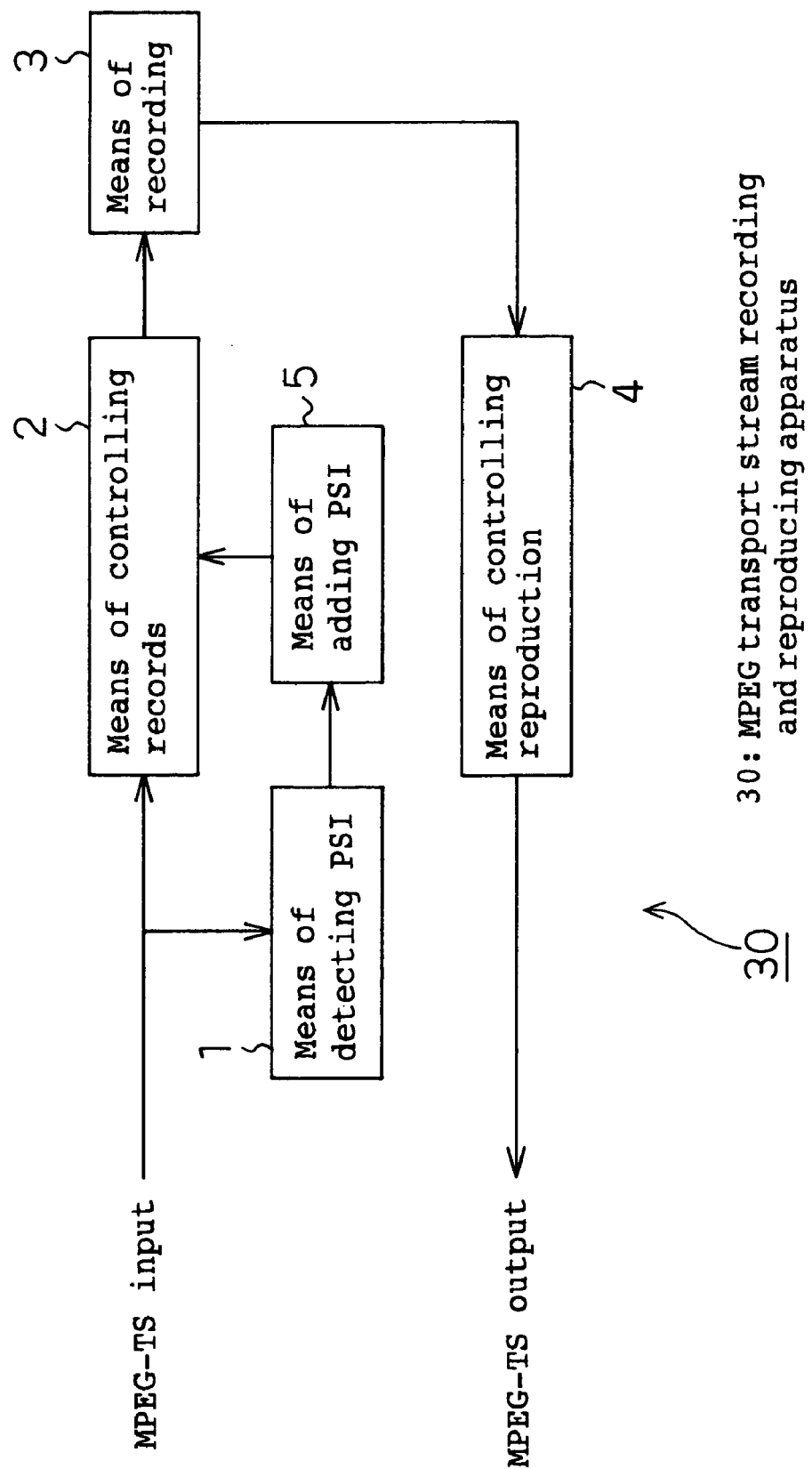
FIG. 4 is a diagram showing a configuration of an MPEG transport stream recording and reproducing apparatus according to Embodiment 3 of the present invention.

FIG. 4 is a diagram showing a configuration of an MPEG transport stream recording and reproducing apparatus according to Embodiment 3. As shown in the diagram, in MPEG transport stream recording and reproducing apparatus 30 wherein the same numbers as FIG. 1 indicate the same divisions, means of adding PSI 5 is means of receiving input from means of detecting PSI 1 and outputting PSI data to means of controlling records 2.

This Embodiment 3 having the above configuration will be described next.

First, recording operation will be described. If means of controlling records 2 starts operation for recording an MPEG-TS, an MPEG-TS is inputted from the outside, and then the MPEG-TS is inputted to both means of detecting PSI 1 and means of controlling records 2.

Next, on receipt of input of the MPEG-TS, means of detecting PSI 1 detects from each of the packets comprising it PSI together with its values of cyclic counters and outputs it as PSI data to means of adding PSI 5. On receipt of input of the PSI data, means of adding PSI 5 outputs it to means of controlling records 2 and adds the PSI data to the head of the MPEG-TS in means of controlling records 2 so that continuity of the values of cyclic counters is kept with the MPEG-TS inputted so far.

Means of controlling records 2 receives input of the MPEG-TS to which PSI data inputted from means of adding PSI 6 is added. More specifically, means of controlling records 2 records in means of recording 3 the MPEG-TS of which head the PSI data is added to.

Next, as for reproducing operation, as with a conventional MPEG-TS recording and reproducing apparatus, it is performed by reading an MPEG-TS from means of recording 3 under control of means of controlling reproduction 4. However, the MPEG-TS recorded in means of recording 3 has already PSI data given to its head, so no redundant operation for detecting PSI is performed on decoding, as in Embodiments 1 and 2.

Thus, this Embodiment 3 allows time for preparation required for reproduction to be shortened as a whole by omitting operation for detecting PSI by the decoder on decoding.

In addition, it also allows reduction of a burden of processing on the apparatus on reproduction by adding PSI data in advance at the stage of the MPEG-TS to be stored in means of recording 3.

Moreover, as in this Embodiment 1, while the above description was given on the assumption that the packets of the PAT, PMT and CAT comprising PSI are single packet respectively, there are also cases where a PAT, a PMT and a CAT are comprised of a plurality of packets respectively. In this case, on detecting PSI, means of detecting PSI 1 detects values of cyclic counters of the PAT, PMT and CAT concurrently with order of arrangement of the plurality of packets, and means of adding PSI 5 performs addition to the MPEG-TS so that the order of arrangement of the packets keeps continuity as with the values of cyclic counters.

Furthermore, as for a method of keeping continuity of values of cyclic counters, it is also possible to rewrite the values of cyclic counters of the PSI data to be added in accordance with the values of cyclic counters of the respective PSI originally included in the MPEG-TS, or to replace respective PSI originally included in the MPEG-TS in accordance with the values of cyclic counters of the PSI data to be added. Especially, this rewriting is implemented by replacing every PSI included in the original MPEG-TS with said PSI data of which values of cyclic counters are consecutively changed.

Embodiment 4

Figure 5:
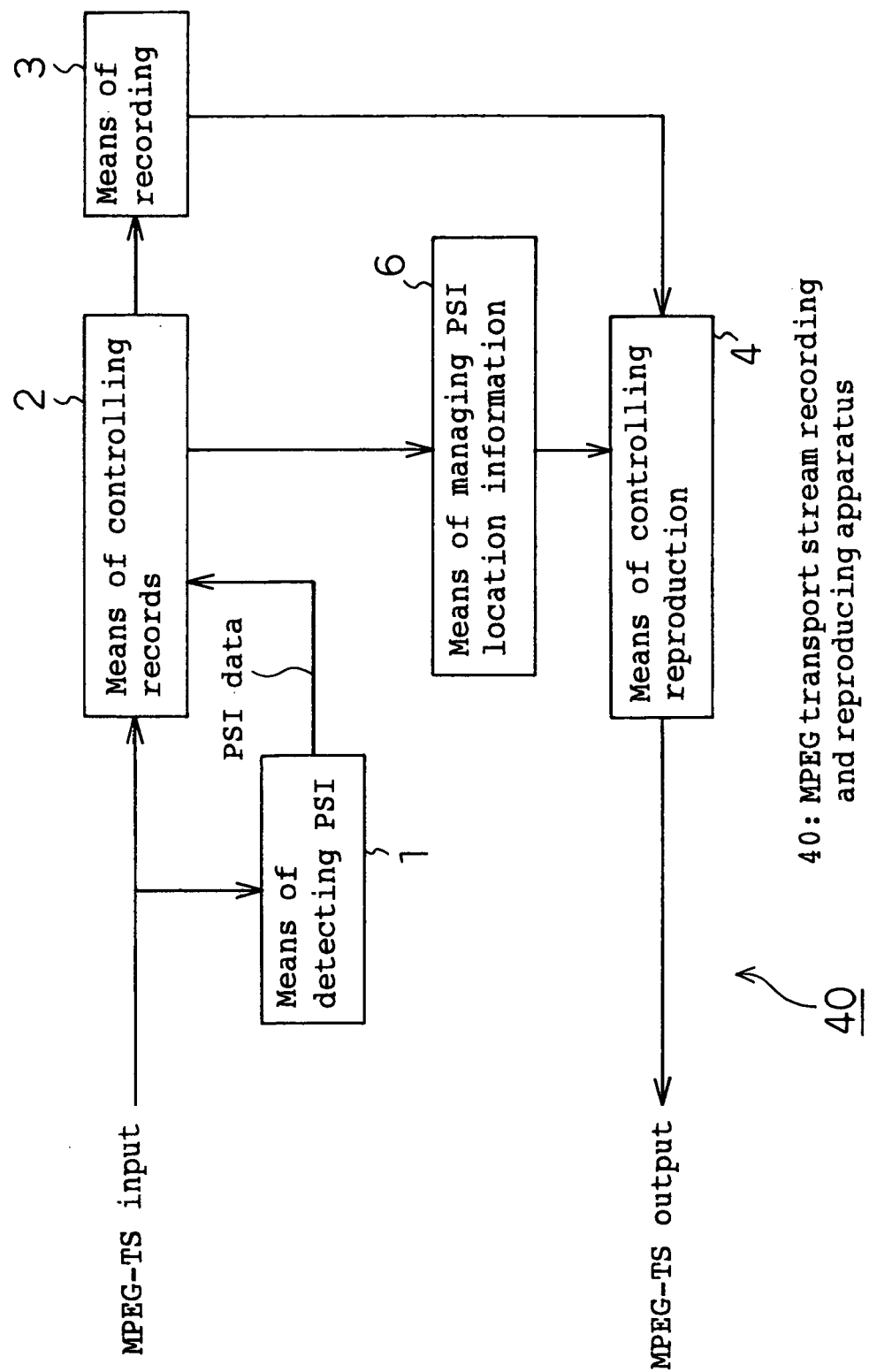
FIG. 5 is a diagram showing a configuration of an MPEG transport stream recording and reproducing apparatus according to Embodiment 4 of the present invention.

FIG. 5 is a diagram showing a configuration of an MPEG transport stream recording and reproducing apparatus according to Embodiment 4 of the present invention. As shown in the diagram, in MPEG transport stream recording and reproducing apparatus 40 wherein the same symbols as FIG. 1 indicate the same divisions, means of managing PSI location information 6 is means placed between means of detecting PSI 1 and means of controlling reproduction 4.

This Embodiment 4 having the above configuration will be described next.

First, recording operation will be described. If means of controlling records 2 starts operation for recording an MPEG-TS, an MPEG-TS is inputted from the outside, and then the MPEG-TS is inputted to both means of detecting PSI 1 and means of controlling records 2.

Next, on receipt of input of the MPEG-TS, means of detecting PSI 1 detects from each of the packets comprising it PSI together with its values of cyclic counters and outputs it as PSI data to means of controlling records 2.

On receipt of input of the MPEG-TS and the PSI data, means of controlling records 2 stores them in means of recording 3. At that time, means of managing PSI location information 6 accesses means of controlling records 2 and acquires as PSI location information a location in the means of recording where means of controlling records 2 has recorded the PSI data.

In the above recording operation, the MPEG-TS and the PSI data are stored in means of recording 3, and PSI location information is stored in means of managing PSI location information 6.

Next, reproducing operation will be described. Means of controlling reproduction 4 reads an MPEG-TS and PSI data recorded in means of recording 3. However, at this stage, the MPEG-TS and PSI data are outputted as uniform digital data without distinguishing their contents.

Next, means of managing PSI location information 6 accesses means of controlling reproduction 4 and detects a location, based on PSI location information, where the PSI data is recorded from digital data being processed in means of controlling reproduction 4. And then, upon detection of the location of the PSI data, means of managing PSI location information 6 fetches the PSI data from the location and adds it to the head of the MPEG-TS in the original digital data so that continuity of the values of cyclic counters is kept so as to become a transport stream in continuity with the MPEG-TS inputted so far.

Lastly, means of controlling reproduction 4 outputs the MPEG-TS of which head the PSI data is added to and of which data is partly changed to the outside of MPEG transport stream recording and reproducing apparatus 10.

Thus, at the time of reproducing the MPEG-TS, an MPEG transport stream recording and reproducing apparatus of this Embodiment 4 detects PSI included in an MPEG-TS as PSI data and adds it to the head of the MPEG-TS so that it allows time for preparation required for reproduction of the MPEG-TS to be shortened as a whole by eliminating the need to record PSI data from means of detecting PSI, and it also allows convenience of data management to be improved by having the PSI data recorded in the means of recording.

Moreover, as in Embodiment 1 of the present invention, while the above description was given on the assumption that the packets of the PAT, PMT and CAT comprising PSI are single packet respectively, there are also cases where a PAT, a PMT and a CAT are comprised of a plurality of packets respectively. In this case, on detecting PSI, means of detecting PSI 1 detects values of cyclic counters of the PAT, PMT and CAT concurrently with order of arrangement of the plurality of packets, and means of managing PSI location information 6 performs addition to the MPEG-TS so that the order of arrangement of the packets keeps continuity as with the values of cyclic counters.

Furthermore, as for a method of keeping continuity of values of cyclic counters, it is also possible to rewrite the values of cyclic counters of the PSI data to be added in accordance with the values of cyclic counters of the respective PSI originally included in the MPEG-TS, or to replace the respective PSI originally included in the MPEG-TS in accordance with the values of cyclic counters of the PSI data to be added.

Embodiment 5

Figure 6:
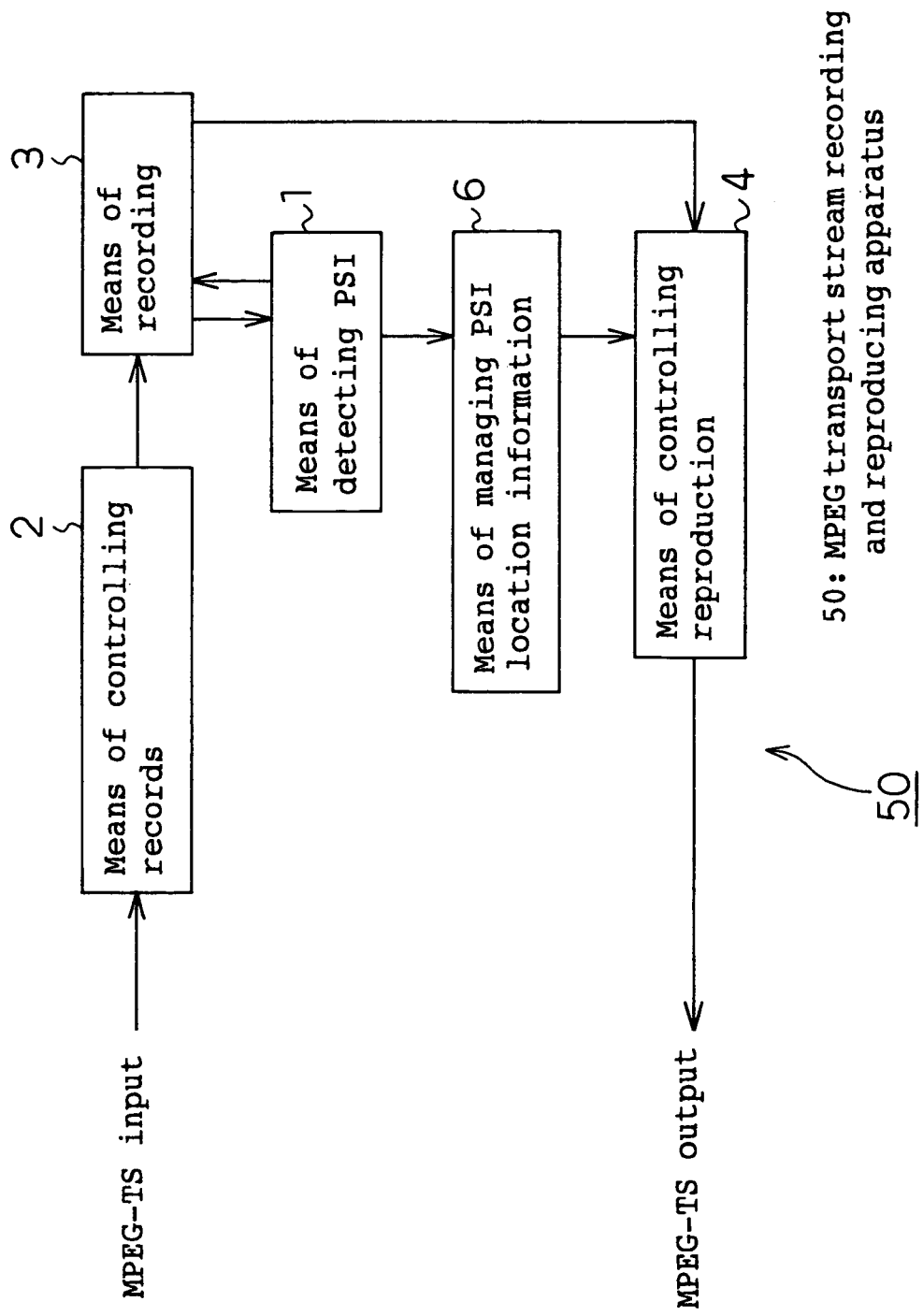
FIG. 6 is a diagram showing a configuration of an MPEG transport stream recording and reproducing apparatus according to Embodiment 5 of the present invention.

FIG. 6 is a diagram showing a configuration of an MPEG transport stream recording and reproducing apparatus according to Embodiment 5 of the present invention. As shown in the diagram, in MPEG transport stream recording and reproducing apparatus 50 wherein the same symbols as FIG. 1 and FIG. 4 indicate the same divisions, means of detecting PSI 1 and means of managing PSI location information 6 are connected to create a route different from that of an MPEG-TS between means of recording 3 and means of controlling reproduction 4.

This Embodiment 5 having the above configuration will be described next.

First, recording operation will be described. If means of controlling records 2 starts operation for recording an MPEG-TS, an MPEG-TS is inputted from the outside, and then the MPEG-TS is inputted to means of controlling records 2. On receipt of input of the MPEG-TS, means of controlling records 2 sends it to means of recording 3. Operation up to this point is the same as that of a conventional MPEG-TS recording and reproducing apparatus.

Next, means of detecting PSI 1 accesses means of recording 3 and detects from the MPEG-TS stored in the means of recording 3 PSI together with its values of cyclic counters and writes them as PSI data to means of recording 3, and also detects a location in the means of recording 3 where the PSI data is stored, and then inputs this location as PSI location information in means of managing PSI location information 6. The means of managing PSI location information stores the inputted PSI location information.

Next, reproducing operation will be described. Means of controlling reproduction 4 reads an MPEG-TS recorded in means of recording 3. On the other hand, means of managing PSI location information 6 accesses means of reproducing 3 and detects a location, based on PSI location information, where the PSI data is recorded from the MPEG-TS being processed in means of controlling reproduction 4, and then fetches the PSI data from the location and adds it to the head of the MPEG-TS in the original digital data so that continuity of the values of cyclic counters is kept so as to become a transport stream in continuity with the MPEG-TS inputted so far.

Lastly, means of controlling reproduction 4 outputs the MPEG-TS of which head the PSI data is added to and of which data is thus partly corrected to the outside of MPEG transport stream recording and reproducing apparatus 10.

Thus, at the time of reproducing an, MPEG-TS, an MPEG transport stream recording and reproducing apparatus of this Embodiment 5 detects PSI included in the MPEG-TS as PSI data and adds it to the head of the MPEG-TS so that it allows time for preparation required for reproduction of the MPEG-TS to be shortened as a whole by eliminating the need to record PSI data from means of detecting PSI, and it also allows operation for detecting PSI to be performed separately from recording and reproducing, that is, independently from operation of means of controlling records 2 and means of controlling reproduction 4.

Moreover, similarly as Embodiment 4 of the present invention, while the above description was given on the assumption that the packets of the PAT, PMT and CAT comprising PSI are single packet respectively, there are also cases where a PAT, a PMT and a CAT are comprised of a plurality of packets respectively. In this case, on detecting PSI, means of detecting PSI 1 detects values of cyclic counters of the PAT, PMT and CAT concurrently with order of arrangement of these plurality of packets, and means of managing PSI location information 6 performs addition to the MPEG-TS so that the order of arrangement of the packets keeps continuity as with the values of cyclic counters.

Furthermore, as for a method of keeping continuity of values of cyclic counters, it is also possible to rewrite the values of cyclic counters of the PSI data to be added in accordance with the values of cyclic counters of the respective PSI originally included in the MPEG-TS, or to replace the respective PSI originally included in the MPEG-TS in accordance with the values of cyclic counters of the PSI data to be added.

Incidentally, while an MPEG transport stream is selected as a subject signal of recording and reproducing in the above Embodiments 1 to 5, a subject signal for recording and reproducing of the present invention can be in short any predetermined signal, not limited thereto, in which additional information of a program is discretely included such as DSS (a format used for digital TV in the U.S.A.).

Figure 12:
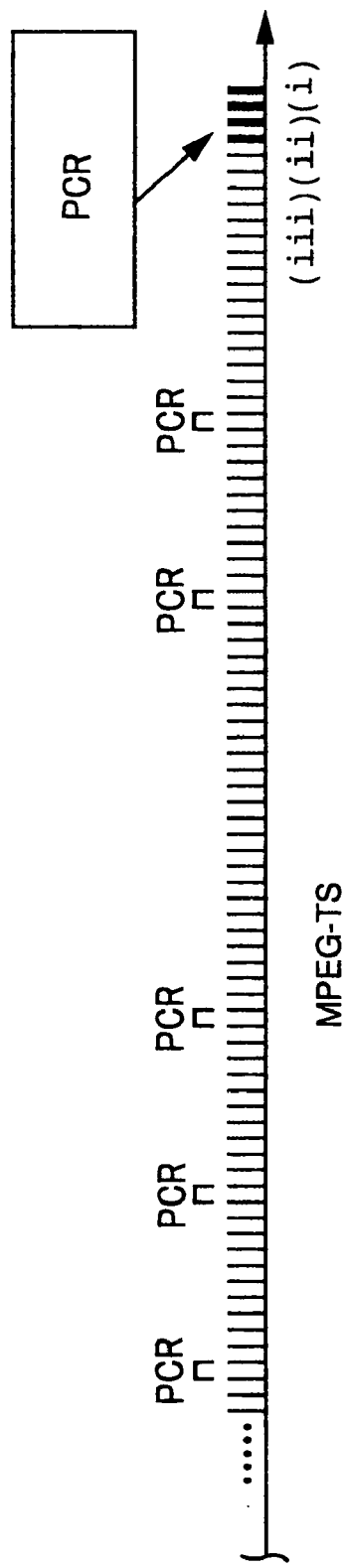
FIG. 12 is a diagram showing existence of PCR in an MPEG transport stream.

In addition, while the above Embodiments 1 to 5 are explained by taking an MPEG transport stream including PSI as an example, the above Embodiments 1 to 5 are also applicable in the case where PCR (Program Clock Reference) is handled in place of PSI (see FIG. 12). Drawings and description of Embodiments using the PCR are omitted since they are easily understood by replacing PSI with PCR in the respective drawings and corresponding description in the above Embodiments 1 to 5.

Figure 13:
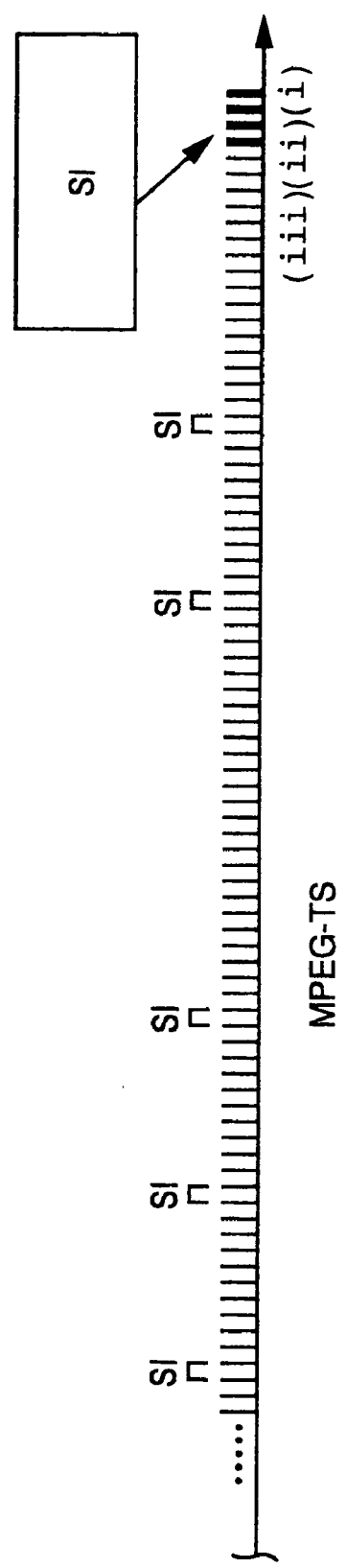
FIG. 13 is a diagram showing existence of SI in an MPEG transport stream.

Moreover, while the above Embodiments 1 to 5 are explained by taking an MPEG transport stream including PSI as an example, the above Embodiments 1 to 5 are also applicable in the case where SI (Service Information) is handled in place of PSI (see FIG. 13). Drawings and description of Embodiments using the SI are omitted since they are easily understood by replacing PSI with SI in the respective drawings and corresponding description in the above Embodiments 1 to 5.

Embodiment 6

FIG. 6 is a diagram showing a configuration of an image stream recording and reproducing apparatus according to Embodiment 6 of the present invention. As shown in the diagram, in MPEG image stream recording and reproducing apparatus 60, means of detecting frame I location information 11 and means of controlling records 2 are means of directly receiving input of an image stream. Also, means of recording 3 is means of recording an image stream under control of means of controlling records 2, means of controlling reproduction 4 is means of reproducing an image stream recorded in means of recording 3, and means of managing frame I location information 12 is means of receiving input from means of detecting frame I location information 11 and means of controlling records 2 and outputting an image stream to the outside of image stream recording and reproducing apparatus 60.

This Embodiment 6 having the above configuration will be described next.

First, recording operation will be described. If means of controlling records 2 starts operation for recording an image stream, an image stream is inputted from the outside, and then the image stream is inputted to both means of detecting frame I location information 11 and means of controlling records 2. On receipt of input of the image stream, means of controlling records 2 records it in means of recording 3. The image stream is saved as accumulated data in means of recording 3.

On the other hand, on receipt of input of the image stream, means of detecting frame I location information 11 detects any location of frame I in this image stream, and inputs it as frame I location information in means of managing frame I location information 12.

On receipt of input of the frame I location information from means of detecting frame I location information 11, the means of managing frame I location information acquires it and information from means of controlling records 2 so as to detect where said frame I location information is located in image data stored in means of recording 3 and manage the storage location of the frame I location information in this means of recording 3.

Thus, in recording operation, an image stream is recorded in means of recording 3 and a storage location of frame I location information on means of recording 3 is recorded in means of managing frame I location information 12 respectively.

Next, reproducing operation will be described. Means of controlling reproduction 4 reads an image stream recorded in means of recording 3. Means of controlling reproduction 4 further acquires the storage location of frame I location information managed by means of detecting frame I location information 11 to detect the location of frame I from the image stream inputted from means of recording 3 and output the image stream headed with the frame I to the outside of image stream recording and reproducing apparatus 60.

While the reproduced image stream is decoded by a conventional image stream decoder, as shown in FIG. 2 (b), at this time, an image stream processed by image stream recording and reproducing apparatus 60 is inputted with frame I at its head to the decoder so that operation for detection of frame I by the decoder will be omitted.

Thus, on recording an image stream, an image transport stream recording and reproducing apparatus of this Embodiment 6 detects any frame I included in an image stream to be recorded as frame I location information in advance, and on reproduction, outputs the image stream headed with this frame I so as to allow time for preparation required for reproduction to be shortened as a whole by omitting operation for detection of frame I by the decoder on decoding.

Embodiment 7

Figure 7:
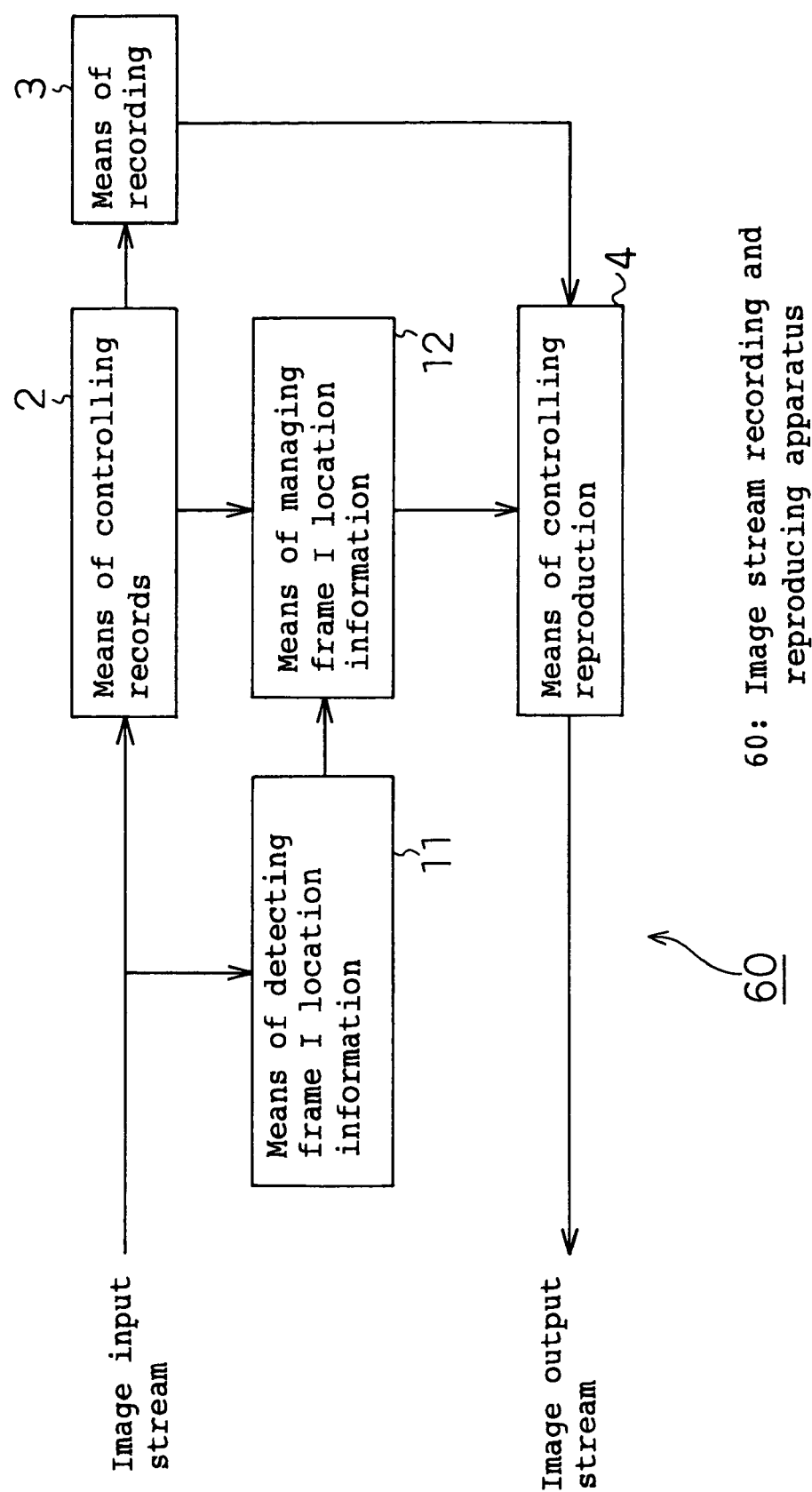
FIG. 7 is a diagram showing a configuration of an MPEG image stream recording and reproducing apparatus according to Embodiment 6 of the present invention.

FIG. 8 is a diagram showing a configuration of an image stream recording and reproducing apparatus of Embodiment 7 of the present invention. As shown in the diagram, in an image stream recording and reproducing apparatus 70, the same symbols as FIG. 7 are the same divisions or the same means. Means of detecting frame I location information 11 and means of controlling records 2 are means of directly receiving input of an image stream, and means of detecting frame I location information 11 is further means of inputting to means of controlling records 2, and means of reading frame I location information 13 is means of accessing means of recording 3 and also inputting to means of controlling reproduction 4.

This Embodiment 7 having the above configuration will be described next.

First, recording operation will be described. If means of controlling records 2 starts operation for recording an image stream, an image stream is inputted from the outside, and then the image stream is inputted to both means of detecting frame I location information 11 and means of controlling records 2.

Next, on receipt of input of the image stream, means of detecting frame I location information 11 detects any location of frame I in the image data, and inputs it as frame I location information to means of controlling records 2.

On receipt of input of the image stream and the above frame I location information, means of controlling records 2 records them both in means of recording 3. The image stream and the frame I location information are stored as accumulated data in means of recording 3.

Next, reproducing operation will be described. Means of controlling reproduction 4 reads the image stream recorded in means of recording 3.

On the other hand, means of reading frame I location information 13 also accesses means of recording 3 and acquires frame I location information and then outputs it to means of controlling reproduction 4.

On receipt of input of the above frame I location information, based on it, means of controlling reproduction 4 detects any location of frame I from the image stream read from means of recording 3, and outputs the image stream headed with the frame I to the outside of image stream recording and reproducing apparatus 70.

While the reproduced image stream is decoded by a conventional image stream decoder, as in Embodiment 6, the image stream is inputted with frame I at its head to the decoder so that operation for detection of frame I by the decoder will be omitted.

Thus, on recording an image stream, an image stream recording and reproducing apparatus of this Embodiment 7 detects any frame I included in an image stream to be recorded as frame I location information in advance and records it in means of recording, and then reproduces the frame I location information and the image stream so that the image stream headed with frame I is outputted so as to allow time for preparation required for reproduction to be shortened as a whole by omitting operation for detection of frame I by the decoder on decoding.

Embodiment 8

FIG. 9 is a diagram showing a configuration of an image stream recording and reproducing apparatus of Embodiment 8 of the present invention. As shown in the diagram, the same symbols as FIG. 7 are the same divisions or the same means. This Embodiment 8 having such configuration will be described next.

First, recording operation will be described. If means of controlling records 2 starts operation for recording an image stream, an image stream is inputted from the outside, and then the image stream is inputted to both means of detecting frame I location information 11 and means of controlling records 2.

On receipt of input of the image stream, means of detecting frame I location information 11 detects any location of frame I from this image stream as frame I location information, generates a recording start signal including this frame I location information and inputs it to means of controlling records 2.

On the other hand, on receipt of input of the image stream and the recording start signal, based on the frame I location information included in the recording start signal, means of controlling records 2 detects any frame I from the inputted image stream and records any image stream including and after this frame I in means of recording 3. Also, means of controlling records 2 abandons any image stream before the above frame I and does not record it in means of recording 3.

Thus, in recording operation, any image stream including and after the frame I detected by means of detecting frame I location information is stored in means of recording 3.

Next, while reproducing operation and decoding will be performed as with a conventional image stream recording and reproducing apparatus, as in these Embodiments 6 and 7, the image stream is configured by frame I at its head so that operation for detection of frame I by the decoder will be omitted.

Thus, on recording an image stream, an image stream recording and reproducing apparatus of this Embodiment 8 detects any frame I included in an image stream to be recorded as frame I location information in advance and records the image stream headed with frame I on recording so as to allow time for preparation required for reproduction to be shortened as a whole by omitting operation for detection of frame I by the decoder on decoding.

Moreover, while an MPEG transport stream recording and reproducing apparatus for detecting PSI and an MPEG image stream recording and reproducing apparatus for detecting frame I are described as separate apparatuses respectively in the Embodiments of the present invention, each of these Embodiments may also be configured by having means of recording 3 in common and arbitrarily combining the divisions and the means, and in that case, the time required for decoding an MPEG-TS can be further shortened.

Furthermore, in the Embodiments of the present invention, while it is described that operation of means of detecting PSI 1, means of controlling records 2, means of controlling reproduction 4, means of adding PSI 5, means of detecting frame I location information 11, means of managing frame I location information 12 and means of reading frame I location information 13 is implemented by means of hardware, it may also be implemented by means of software, that is, by using a computer and operating a program.

Also, while the Embodiments of the present invention are described centering on an MPEG transport stream recording and reproducing apparatus or an MPEG image stream recording and reproducing apparatus thereof, the present invention is a medium having a program and/or data for having all or part of the functions of all or part of the means of the above-mentioned present invention executed by a computer, wherein said program and/or data readable and read by a computer perform said functions in cooperation with said computer.

The data in this case includes data structures, data formats, data types and so on.

A medium includes, for instance, a record medium such as ROM, a transmission medium such as the Internet, or a transmission medium such as light, radio wave or a sound wave.

A medium having something includes, for instance, a record medium recording a program and/or data or a transmission medium transmitting a program and/or data.

Processible by computer means, for instance, in the case of a record medium such as ROM, that it is readable by a computer, and in the case of a transmission medium, its meaning includes that a program and/or data to be transmitted can be handled by a computer as a result of transmission.

An information aggregate includes, for instance, software such as a program and/or data.

INDUSTRIAL APPLICABILITY

As it is apparent from the above description, the present invention allows high-speed reproduction of data by omitting the time for detecting PSI or PCR on decoding.

The present invention also allows high-speed reproduction of data by omitting the time for detecting frame I on decoding.

What is claimed is:

1. A recording and reproducing apparatus, comprising:
   recording means for recording a predetermined MPEG transport stream discretely including Program Specific Information (PSI) or Service Information (SI) of a program;
   detecting means for detecting the PSI or the SI from the MPEG transport stream; and
   adding means for adding the PSI or the SI before the head of the MPEG transport stream upon recording of the MPEG transport stream.

2. The apparatus of claim 1 wherein said adding means adds the PSI or the SI before the head of the MPEG transport stream while maintaining the PSI or the SI situated in the originally located position.

3. The apparatus of claim 1 wherein said detecting means detects the PSI or the SI together with a value of its cyclic counter and said adding means adds the PSI or the SI before the head of the MPEG transport stream so that continuity of the values of respective cyclic counters is kept.

4. The apparatus of claim 3 wherein the continuity of the values of respective cyclic counters is kept by rewriting the values in accordance with the values of cyclic counters of the respective PSIs or SIs originally included in the MPEG transport stream, or by replacing respective PSIs or SIs originally included in the MPEG transport stream in accordance with the values of cyclic counters of the PSIs or SIs.

5. A recording and reproducing apparatus, comprising:
   a recorder for recording a predetermined MPEG transport stream discretely including Program Specific Information (PSI) or Service Information (SI) of a program;
   a detector for detecting the PSI or the SI from said MPEG transport stream; and
   an adder for adding the PSI or the SI before the head of the MPEG transport stream upon recording of the MPEG transport stream.

6. The apparatus of claim 5 wherein said adder adds the PSI or the SI before the head of the MPEG transport stream while maintaining the PSI or the SI situated in the originally located position.

7. The apparatus of claim 5 wherein said detector detects the PSI or the SI together with a value of its cyclic counter and said adder adds the PSI or the SI to the head of the MPEG transport stream so that continuity of the values of respective cyclic counters is kept.

8. The apparatus of claim 7 wherein the continuity of the values of respective cyclic counters is kept by rewriting the values in accordance with the values of cyclic counters of the respective PSIs or Sis originally included in the MPEG transport stream, or by replacing respective PSIs or Sis originally included in the MPEG transport stream in accordance with the values of cyclic counters of the PSIs or SIs.

9. A recording and reproducing method, comprising steps of:
   recording a predetermined MPEG transport stream discretely including Program Specific Information (PSI) or Service Information (SI) of a program;
   detecting the PSI or the SI from the MPEG transport stream; and
   adding the PSI or the SI before the head of the MPEG transport stream upon recording of the MPEG transport stream.

10. The method of claim 9 wherein the PSI or the SI is added before the head of the MPEG transport stream while maintaining the PSI or the SI situated in the originally located position.

11. The method of claim 9 wherein the PSI or the SI is detected together with a value of its cyclic counter and the PSI or the SI is added to the head of the MPEG transport stream so that continuity of the values of respective cyclic counters is kept.

12. The method of claim 11 wherein the continuity of the values of respective cyclic counters is kept by rewriting the values in accordance with the values of cyclic counters of the respective PSIs or Sis originally included in the MPEG transport stream, or by replacing respective PSIs or Sis originally included in the MPEG transport stream in accordance with the values of cyclic counters of the PSIs or SIs.

* * * * *